United States Patent
Magness et al.

(10) Patent No.: US 10,989,035 B2
(45) Date of Patent: Apr. 27, 2021

(54) PROPPANT RAMP-UP FOR CLUSTER EFFICIENCY

(71) Applicant: HALLIBURTON ENERGY SERVICES, INC., Houston, TX (US)

(72) Inventors: Jeremy Blair Magness, Houston, TX (US); Neil Modeland, Rosenberg, TX (US); Ubong Inyang, Humble, TX (US); Jason Eric Maxey, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/447,608

(22) Filed: Jun. 20, 2019

(65) Prior Publication Data

US 2020/0400004 A1 Dec. 24, 2020

(51) Int. Cl.

| | | |
|---|---|---|
| *E21B 43/267* | (2006.01) | |
| *E21B 43/16* | (2006.01) | |
| *E21B 47/06* | (2012.01) | |
| *C09K 8/68* | (2006.01) | |
| *C09K 8/80* | (2006.01) | |
| *C09K 8/588* | (2006.01) | |
| *G01N 11/02* | (2006.01) | |
| *G01N 11/00* | (2006.01) | |

(52) U.S. Cl.
CPC ............ *E21B 43/267* (2013.01); *G01N 11/00* (2013.01); *C09K 8/80* (2013.01); *C09K 2208/28* (2013.01)

(58) Field of Classification Search
CPC .................................................... G01N 11/02
See application file for complete search history.

(56) References Cited

U.S. PATENT DOCUMENTS

| | | | |
|---|---|---|---|
| 5,095,987 A | * | 3/1992 | Weaver ............... C09K 8/56 166/276 |
| 6,439,310 B1 | | 8/2002 | Scott, III et al. |
| 6,795,773 B2 | | 9/2004 | Soliman et al. |
| 6,935,424 B2 | | 8/2005 | Lehman et al. |
| 7,210,528 B1 | | 5/2007 | Brannon et al. |
| 7,451,812 B2 | | 11/2008 | Cooper et al. |
| 7,516,793 B2 | | 4/2009 | Dykstra |
| 7,673,507 B2 | | 3/2010 | Walters et al. |
| 7,712,534 B2 | | 5/2010 | Bryant et al. |

(Continued)

FOREIGN PATENT DOCUMENTS

| | | |
|---|---|---|
| WO | 2018022044 | 2/2018 |
| WO | 2018125176 | 7/2018 |

(Continued)

OTHER PUBLICATIONS

Spain, David R., et al., Geo-Engineered Completion Optimization: An Integrated, Multi-Disciplinary Approach to Improve Stimulation Efficiency in Unconventional Shale Reservoirs, Jan. 2015, pp. 1-12, Society of Petroleum Engineers.

(Continued)

*Primary Examiner* — Charles R Nold
(74) *Attorney, Agent, or Firm* — McAfee & Taft

(57) ABSTRACT

Methods disclosed improve the cluster efficiency during stimulation treatment, such as fracturing treatments. The methods incorporate any combination of the following: slurry rate ramp, proppant ramp and hold, and constant apparent viscosity during the stimulation treatment.

12 Claims, 11 Drawing Sheets

(56) References Cited

U.S. PATENT DOCUMENTS

| | | | |
|---|---|---|---|
| 7,938,181 B2 | 5/2011 | Dusterhoft et al. | |
| 9,890,323 B2 | 2/2018 | Holtsclaw et al. | |
| 10,138,415 B2 | 11/2018 | Bryant et al. | |
| 2003/0106690 A1* | 6/2003 | Boney | C09K 8/703 166/280.1 |
| 2012/0247764 A1 | 10/2012 | Panga et al. | |
| 2014/0251610 A1 | 9/2014 | Brannon et al. | |
| 2016/0340571 A1 | 11/2016 | Liang et al. | |
| 2017/0145295 A1 | 5/2017 | Nguyen et al. | |
| 2018/0238155 A1 | 8/2018 | Nguyen et al. | |
| 2018/0245443 A1 | 8/2018 | Nguyen et al. | |
| 2019/0024489 A1 | 1/2019 | Nguyen et al. | |

FOREIGN PATENT DOCUMENTS

| | | |
|---|---|---|
| WO | 2018126106 | 7/2018 |
| WO | 2018190835 | 10/2018 |

OTHER PUBLICATIONS

Ugueto C., Gustavo A., et al., Perforation Cluster Efficiency of Cemented Plug and Perf Limited Entry Completions; Insights from Fiber Optics Diagnostics, Feb. 2016, pp. 1-17, Society of Petroleum Engineers.

PCT International Search Report & Written Opinion mailed in corresponding PCT Application No. PCT/US2020/033108 dated Aug. 28, 2020, pp. 1-10.

\* cited by examiner

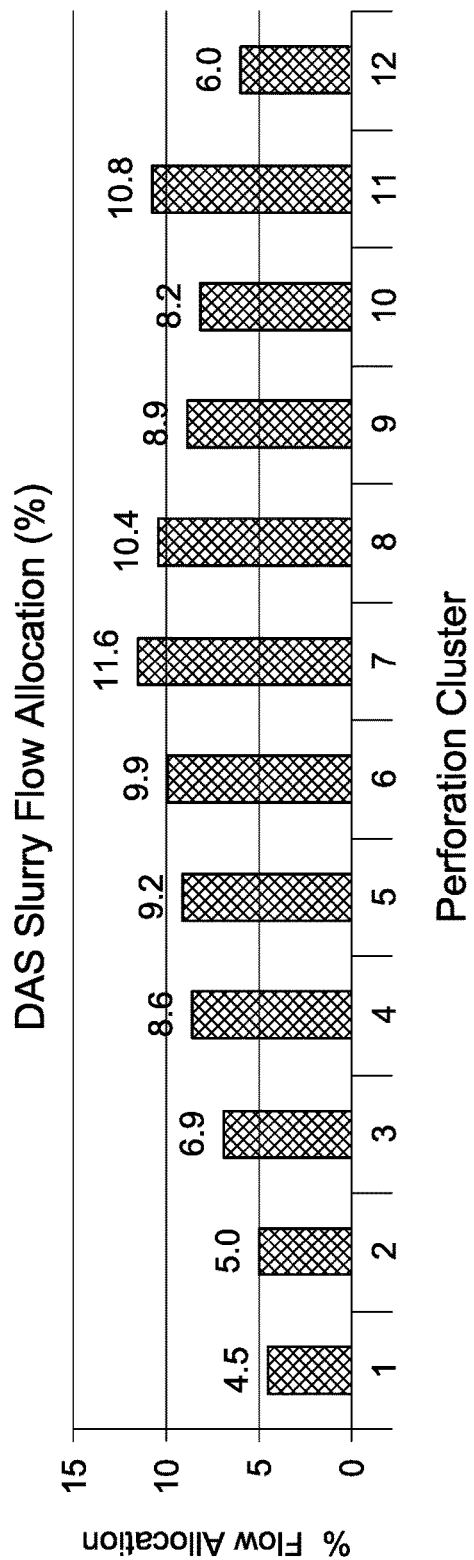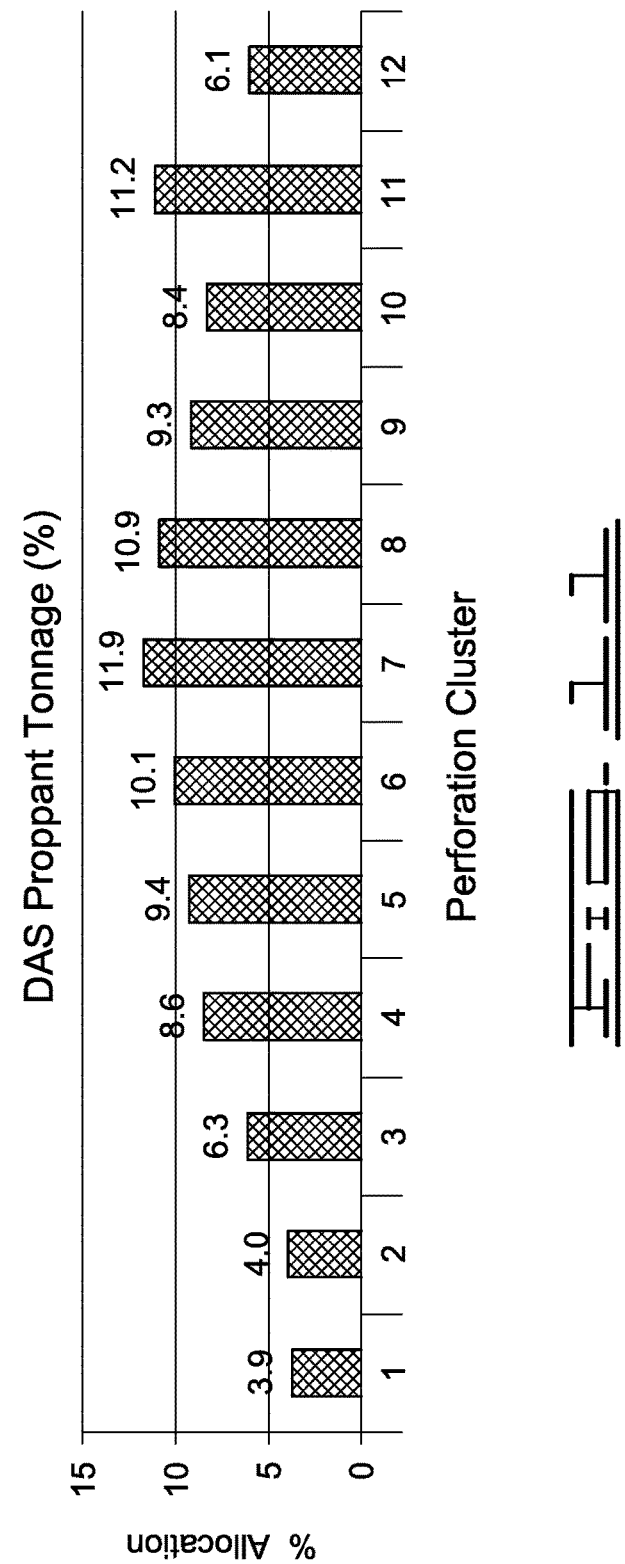

PROPPANT RAMP-UP FOR CLUSTER EFFICIENCY

FIELD

The present disclosure relates generally to downhole operations for subterranean formations, more specifically in certain embodiments, to stimulation treatment of such subterranean formations.

BACKGROUND

In the oil and gas industry, a well that is not producing as expected may need stimulation to increase the production of subsurface hydrocarbon deposits, such as oil and natural gas. Hydraulic fracturing is a type of stimulation treatment that is used for well stimulation in unconventional reservoirs. In hydraulic fracturing, a fracturing fluid is pumped at an elevated pressure from a wellbore into adjacent hydrocarbon-bearing subterranean formations. The pumped fracturing fluid splits or "fractures" the rock formation along veins or planes extending laterally from the wellbore. In some applications, the fracturing fluid contains propping agents (alternately referred to as "proppant") that are also injected into the opened fractures. Once a desired fracture network is formed, the fluid flow is reversed and the liquid portion of the fracturing fluid is removed. The proppant is intentionally left behind to prevent the fractures from closing onto themselves due to the weight and stresses within the formation. Accordingly, the proppant quite literally "props" or supports the fractures to remain open, yet remain permeable to hydrocarbon fluid flow since they form a packed bed of particles with interstitial void space connectivity.

A multistage stimulation treatment operation may involve drilling a horizontal wellbore and injecting treatment fluid into a surrounding formation in multiple stages via a series of perforations or formation entry points along a path of a wellbore through the formation. During each of the stimulation treatments, different types of fracturing fluids, proppant materials (e.g., sand), additives and/or other materials may be pumped into the formation via the entry points or perforations at high pressures and/or rates to initiate and propagate fractures within the formation to a desired extent.

Properly stimulating perforation clusters during multistage stimulation has been an issue in the stimulation process. Typically, there is unequal fluid and proppant distribution into the perforation cluster(s). This uneven cluster stimulation could potentially lead to frac driven interactions (sometimes called well bashing), under-stimulation of the reservoir and inefficient use of fracturing material and horsepower.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

FIG. 11 is a graphical illustration of proppant concentration (%-allocation) versus perforation cluster for the Example.

DETAILED DESCRIPTION

The present disclosure may be understood more readily by reference to this detailed description. Numerous specific details are set forth in order to provide a thorough understanding of the embodiments described herein. However, it will be understood by those of ordinary skill in the art that the embodiments described herein can be practiced without these specific details. The description is not to be considered as limiting the scope of the embodiments described herein.

As will be described in further detail below, embodiments of the present disclosure may be used to improve the cluster efficiency during stimulation treatment, such as fracturing treatments. The new method incorporates any combination of the following: slurry rate ramp, proppant ramp to maximum and hold, proppant ramp to maximum concentration, and constant apparent viscosity during the stimulation treatment.

Perforation cluster efficiency has been the desired treatment objective for stimulation treatments. The idea is that by equally stimulating perforation clusters, the reservoir in that stage will be well stimulated, and unwelcomed issues like fracture driven interactions (FDI) (also known as frac hits or well bashing) will be prevented or mitigated. FDI can occur when several wells are initiated from a well pad. If the perforation cluster efficiency is low in one well, then proppant will not be equally distributed among the perforations in a stage, and some fractures can grow out longer than intended resulting in them intruding into a neighboring well. Unfortunately, perforation clusters are not often adequately stimulated resulting in bypassed reserved, under-stimulated and/or over stimulated clusters, FDI and waste of fluid and proppant.

Figure 1:
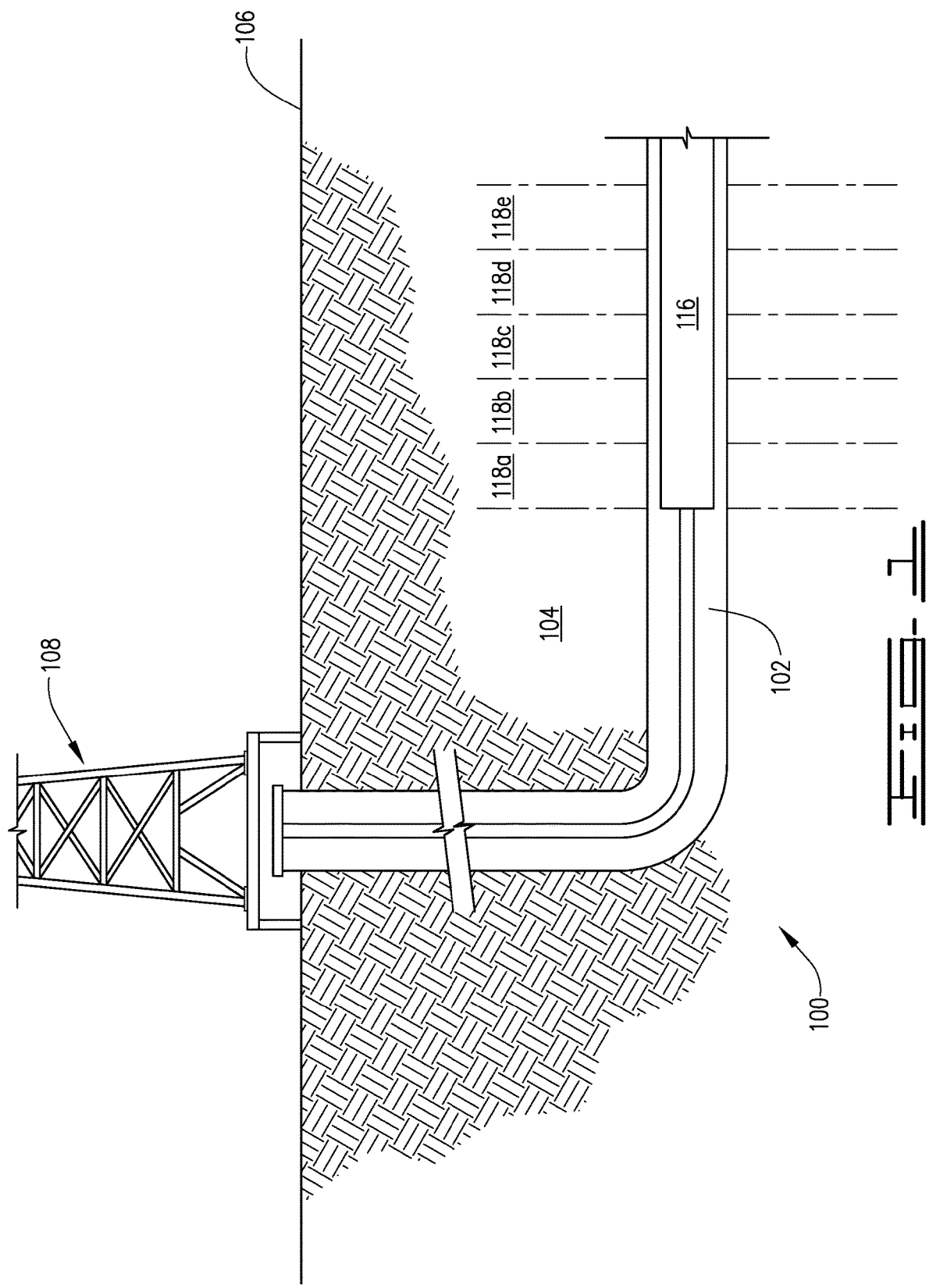
FIG. 1 is a diagram of an illustrative well system for a multistage stimulation treatment of a hydrocarbon reservoir formation.

The embodiments can be better understood with reference to a stimulation treatment system illustrated in FIG. 1. FIG. 1 is a diagram illustrating an example of a well system 100 for performing a multistage stimulation treatment of a hydrocarbon reservoir formation. As shown in the example of FIG. 1, well system 100 includes a wellbore 102 in a subsurface formation 104 (also referred to herein as "subterranean formation 104") beneath a surface 106 of the wellsite. Wellbore 102 as shown in the example of FIG. 1 includes a horizontal wellbore. While the embodiments of this disclosure are particularly useful in horizontal-wellbore stimulation treatments, the techniques and methods therein may be applied to any combination of horizontal, vertical, slant, curved, and/or other wellbore orientations. The subsurface formation 104 may include a reservoir that contains hydrocarbon resources, such as oil, natural gas, and/or others. For example, the subsurface formation 104 may be a rock formation (e.g., shale, coal, sandstone, granite, and/or others) that includes hydrocarbon deposits, such as oil and natural gas. In some cases, the subsurface formation 104 may be a tight gas formation that includes low permeability rock (e.g., shale, coal, and/or others). The subsurface formation 104 may be composed of naturally fractured rock and/or natural rock formations that are not fractured to any significant degree.

Well system 100 also includes a fluid injection system 108 for injecting treatment fluid, e.g., hydraulic fracturing fluid, into the subsurface formation 104 over multiple sections 118a, 118b, 118c, 118d, and 118e (collectively referred to herein as "sections 118") of the wellbore 102, as will be described in further detail below. Each of the sections 118 may correspond to, for example, a different stage or interval of the multistage stimulation treatment. The boundaries of the respective sections 118 and corresponding treatment stages/intervals along the length of the wellbore 102 may be delineated by, for example, the locations of bridge plugs, packers and/or other types of equipment in the wellbore 102. Additionally or alternatively, the sections 118 and corresponding treatment stages may be delineated by particular features of the subsurface formation 104. Although five sections are shown in FIG. 1, it should be appreciated that any number of sections and/or treatment stages may be used as desired for a particular implementation. Furthermore, each of the sections 118 may have different widths or may be uniformly distributed along the wellbore 102.

During each stage of the stimulation treatment, the injection system 108 may alter stresses and create a multitude of fractures in the subsurface formation 104 by injecting the treatment fluid into the surrounding subsurface formation 104 via a plurality of formation entry points along a portion of the wellbore 102 (e.g., along one or more of sections 118). The fluid may be injected through any combination of one or more valves of the injection tools 116. The injection tools 116 may include numerous components including, but not limited to, valves, sliding sleeves, actuators, ports, and/or other features that communicate treatment fluid from a working string disposed within the wellbore 102 into the subsurface formation 104 via the formation entry points. The formation entry points may include, for example, open-hole sections along an uncased portion of the wellbore path, a cluster of perforations along a cased portion of the wellbore path, ports of a sliding sleeve completion device along the wellbore path, slots of a perforated liner along the wellbore path, or any combination of the foregoing. However, the techniques of this disclosure can be particularly useful where the formation entry points are clusters of perforations. In such case, each wellbore section 118 is a different cluster of perforations which is treated by stimulation separately from the other wellbore sections.

As used herein, "perforations" and grammatical variants thereof, refers to a communication tunnel created through a wall of a wellbore, including through a casing string, into a subsurface formation through which production fluids may flow. Perforations may be formed by any means suitable in a subsurface formation including, but not limited to, shaped explosive charges, perforating guns, bullet perforating, abrasive jetting, or high-pressure fluid jetting, without departing from the scope of the present disclosure.

As used herein, "perforation cluster" refers to a grouping of perforations along the length of the wellbore defined by non-perforated portions of the wellbore on either end of the perforation cluster.

Figure 2:
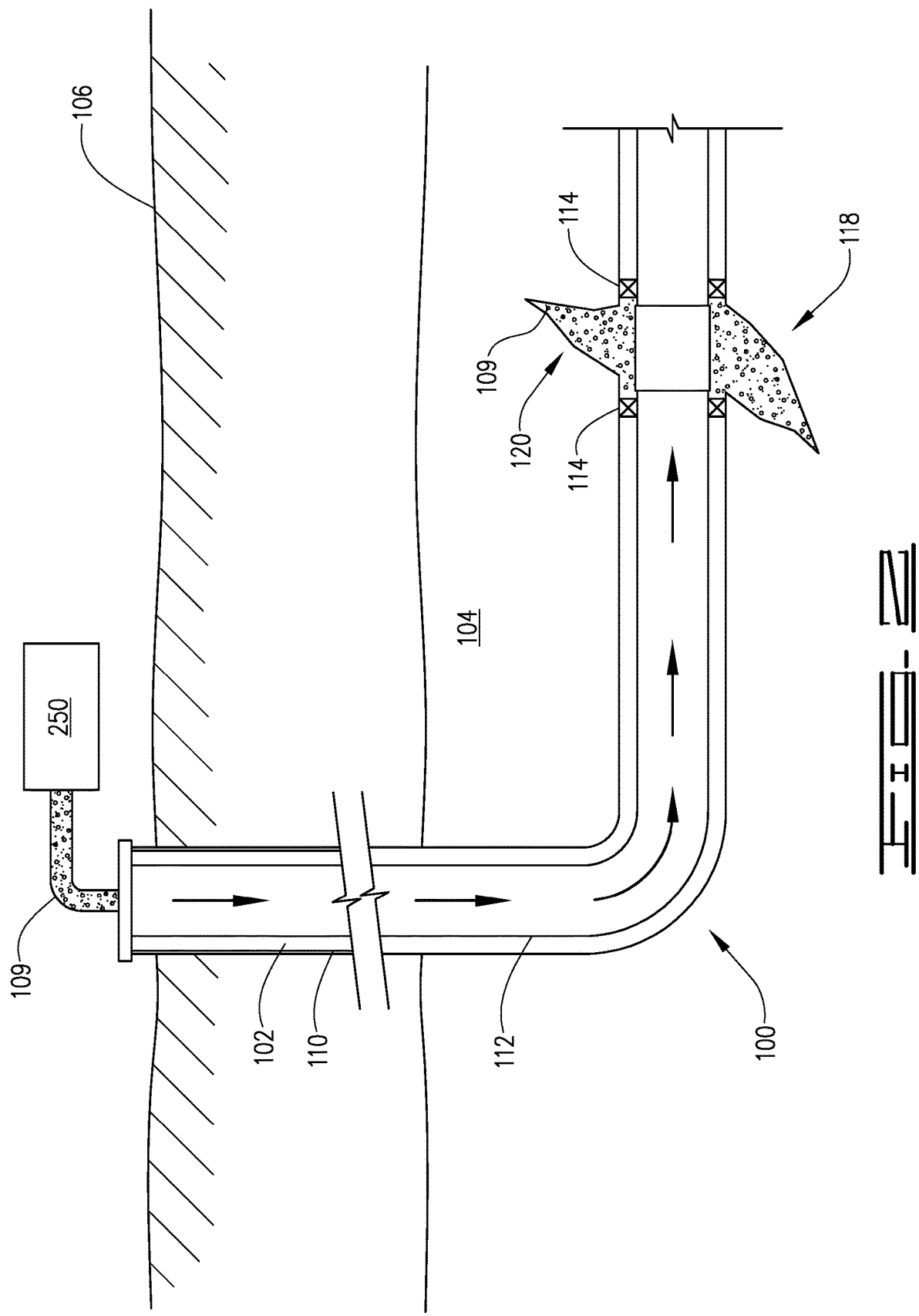
FIG. 2 is a diagram illustrating an example of a subterranean formation in which a stimulation or fracturing operation may be performed in accordance with certain embodiments of the present disclosure. For simplicity, FIG. 2 only shows one of the stages or wellbore sections.

FIG. 2 shows the well system 100 during a stimulation or fracturing operation in a portion of a subsurface formation 104 surrounding wellbore 102. For simplicity, FIG. 2 only shows one of the stages or wellbore sections 118. The wellbore 102 extends from the surface 106, and the fracturing fluid 109 is applied to a portion of the subsurface formation 104 surrounding the horizontal portion of the wellbore. The wellbore 102 can include a casing 110 that is cemented or otherwise secured to the wellbore wall. The wellbore 102 can be uncased or include uncased sections. Perforations can be formed in the casing 110 to allow fracturing fluids and/or other materials to flow into the subsurface formation 104.

The well is shown with a work string 112 suspended from the surface 106 into the wellbore 102. A pump and blender system 250 is coupled to the work string 112 to pump the fracturing fluid 109 into the wellbore 102. The work string 112 may include coiled tubing, jointed pipe, and/or other structures that allow fluid to flow into the well bore 102. The work string 112 can include flow control devices, bypass valves, ports, and or other tools or well devices that control a flow of fluid from the interior of the work string 112 into the subsurface formation 104. For example, the work string 112 may include ports adjacent the wellbore wall to communicate the fracturing fluid 109 directly into the subsurface formation 104, and/or the work string 112 may include ports that are spaced apart from the wellbore wall to communicate the fracturing fluid 109 into an annulus in the wellbore between the work string 112 and the wellbore wall.

The work string 112 and/or the wellbore 102 may include one or more packers 114 that seal the annulus between the work string 112 and wellbore 102 to define wellbore section 118, which is an interval of the wellbore 102 into which the fracturing fluid 109 will be pumped. FIG. 2 shows two packers 114, one defining an uphole boundary of the interval and one defining the downhole end of the interval. When the fracturing fluid 109 is introduced into wellbore 102 (e.g., in FIG. 2, the area of the wellbore 102 between packers 114) at a sufficient hydraulic pressure, one or more fractures 120 may be created or enhanced in the subsurface formation 104. The proppant particulates in the fracturing fluid 109 may enter the fractures 120 where they may remain after the fracturing fluid flows out of the wellbore. These proppant particulates may "prop" fractures 120 such that fluids may flow more freely through the fractures 120.

Figure 3:
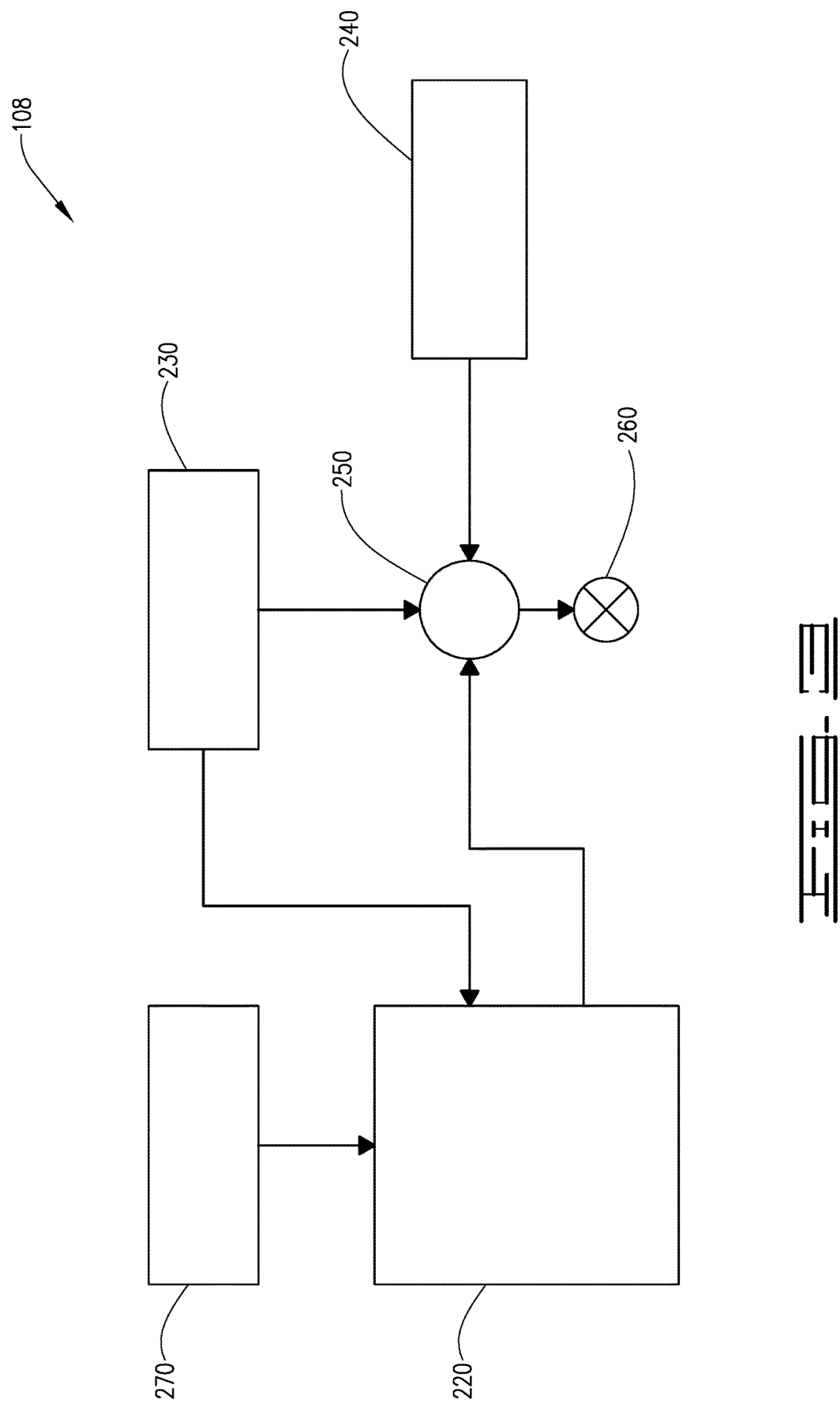
FIG. 3 is a diagram illustrating an example of a fracturing fluid mixing and an injection system that may be used in accordance with certain embodiments of the present disclosure.

Turning now to FIG. 3, a diagram is provided, which illustrates an example of a fracturing fluid mixing and an injection system 108 that may be used in accordance with certain embodiments of the present disclosure. In certain instances, the injection system 108 includes a fracturing fluid producing apparatus 220, a fluid source 230, a proppant source 240, a pump and blender system 250, and an additive source 270. Injection system 180 resides at the surface at a wellsite where the wellhead 260 of the well system 100 is located. In certain instances, the fracturing fluid producing apparatus 220 combines a gel pre-cursor with fluid (e.g., liquid or substantially liquid) from a fluid source 230, to produce a hydrated fracturing fluid that is used to fracture the formation. The hydrated fracturing fluid can be a fluid for ready use in a fracture stimulation treatment of the subterranean zone or a concentrate to which additional fluid is added prior to use in a fracture stimulation of the subterranean zone. In other instances, the fracturing fluid producing apparatus 220 can be omitted and the fracturing fluid sourced directly from the fluid source 230. In certain instances, the fracturing fluid may comprise water, a hydrocarbon fluid, a polymer gel, foam, air, wet gases and/or other fluids.

The proppant source 240 can include a proppant for combination with the fracturing fluid. The system may also include additive source 270 that provides one or more additives (e.g., gelling agents, friction reducers, weighting agents, and/or other optional additives) to alter the properties of the fracturing fluid. For example, the other additives 270 can be included to reduce pumping friction, to reduce or eliminate the fluid's reaction to the geological formation in which the well is formed, to operate as surfactants, and/or to serve other functions.

The pump and blender system 250 receives the fracturing fluid and combines it with other components, which can include proppant from the proppant source 240 and/or additional fluid from the additives 270. The resulting mixture may be pumped down through the wellhead 260 under a pressure sufficient to create or enhance one or more fractures in a subterranean zone, for example, to stimulate production of fluids from the zone. Notably, in certain instances, the fracturing fluid producing apparatus 220, fluid source 230, additive source 270, and/or proppant source 240 may be equipped with one or more metering devices (not shown) to control the flow of fluids, proppants, and/or other compositions to the pump and blender system 250. Such metering devices may permit the pump and blender system 250 to source from one, some, or all of the different sources at a given time, and may facilitate the preparation of fracturing fluids in accordance with the present disclosure using continuous mixing or "on-the-fly" methods. Thus, for example, the pump and blender system 250 can provide just fracturing fluid into the well at some times, just proppants at other times, and combinations of those components at yet other times.

Stimulation treatment may incorporate a proppant step treatment. In a step treatment, a pad fluid is first introduced through a well system such as described above so that the pad fluid enters the subsurface formation through one or more perforations within a wellbore section—a cluster of perforations. The pad fluid as used herein is a well treatment fluid—such as a stimulation fluid or fracturing fluid—that does not have any proppant. More typically, "pad fluid" refers to a fluid that does not contain any solid. The pad fluid is injected first until the fractures are wide enough to accept proppant.

Figure 4:
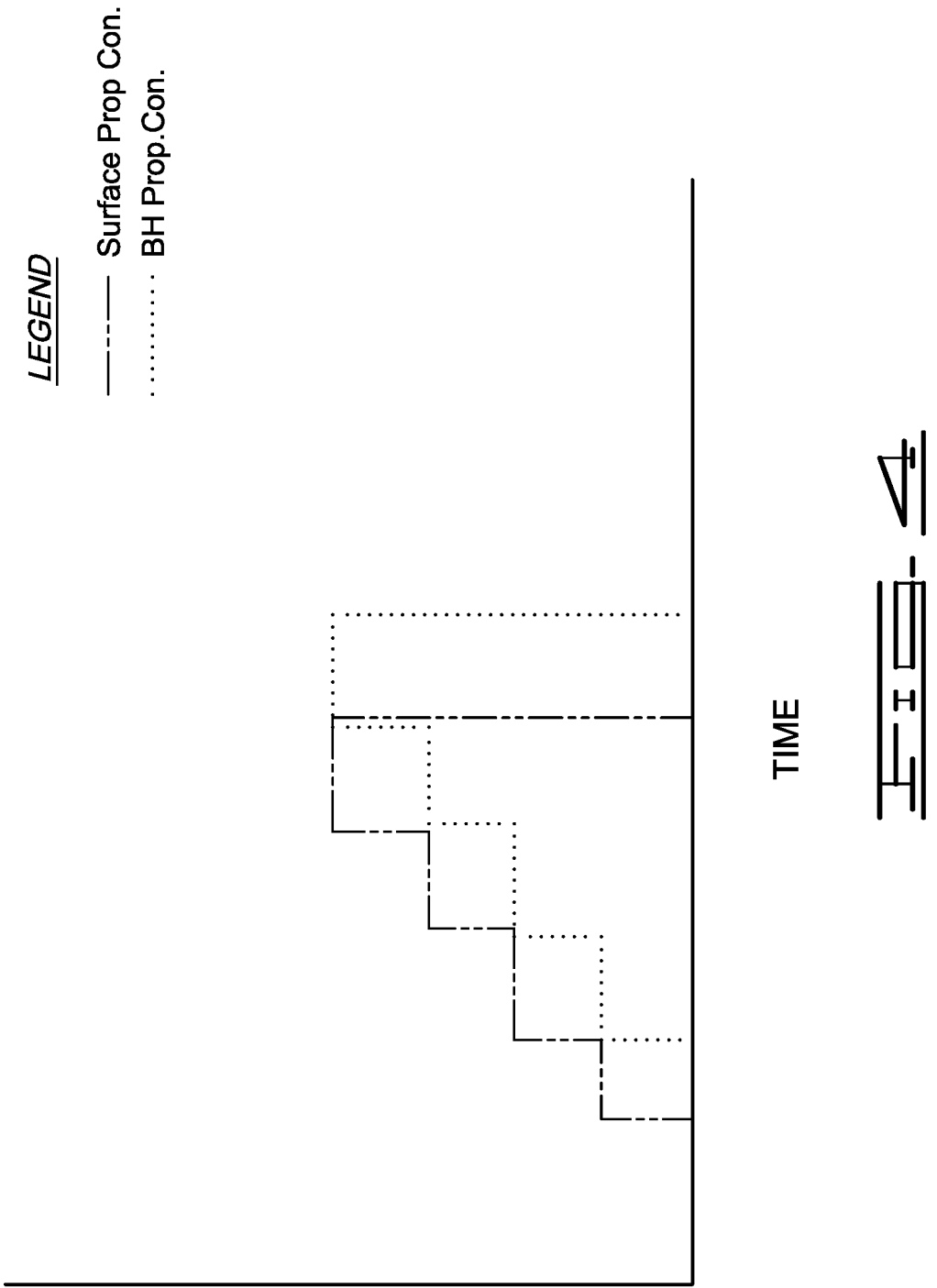
FIG. 4 is a diagram illustrating a method of step-wise increasing the proppant concentration.

As indicated above, the pad fluid is injected at a predetermined rate so as to open the fractures sufficiently to receive proppant. Once sufficient pad fluid has been introduced to open up the fractures, the proppant is introduced into the pad fluid to form a treatment fluid. Optionally, the proppant can be introduced into different treatment fluid than the pad fluid. In some embodiments, stimulation operations, the proppant concentration starts at a low concentration, which is held constant until a predetermined volume of treatment fluid has been pumped to the subsurface formation. Afterwards, the concentration of proppant is increased in the treatment fluid being injected downhole and then held constant again until a second predetermined volume of treatment fluid has been pumped to the subsurface formation. As shown in FIG. 4, these steps of increasing the proppant concentration are continued in a step-like manner until the desired maximum proppant concentration is reached. FIG. 4 illustrates the step-wise increase of proppant concentration in the treatment fluid at the surface—prior to introduction or injection of the treatment fluid downhole. Also, FIG. 4 illustrates the BH proppant concentration, which is the "bottom hole" proppant concentration, in this case the concentration of the proppant at the subterranean formation. As will be appreciated, the BH concentration lags behind the surface proppant concentration. At some time, after sufficient proppant has been introduced downhole, the introduction of proppant downhole is stopped.

Figure 5:
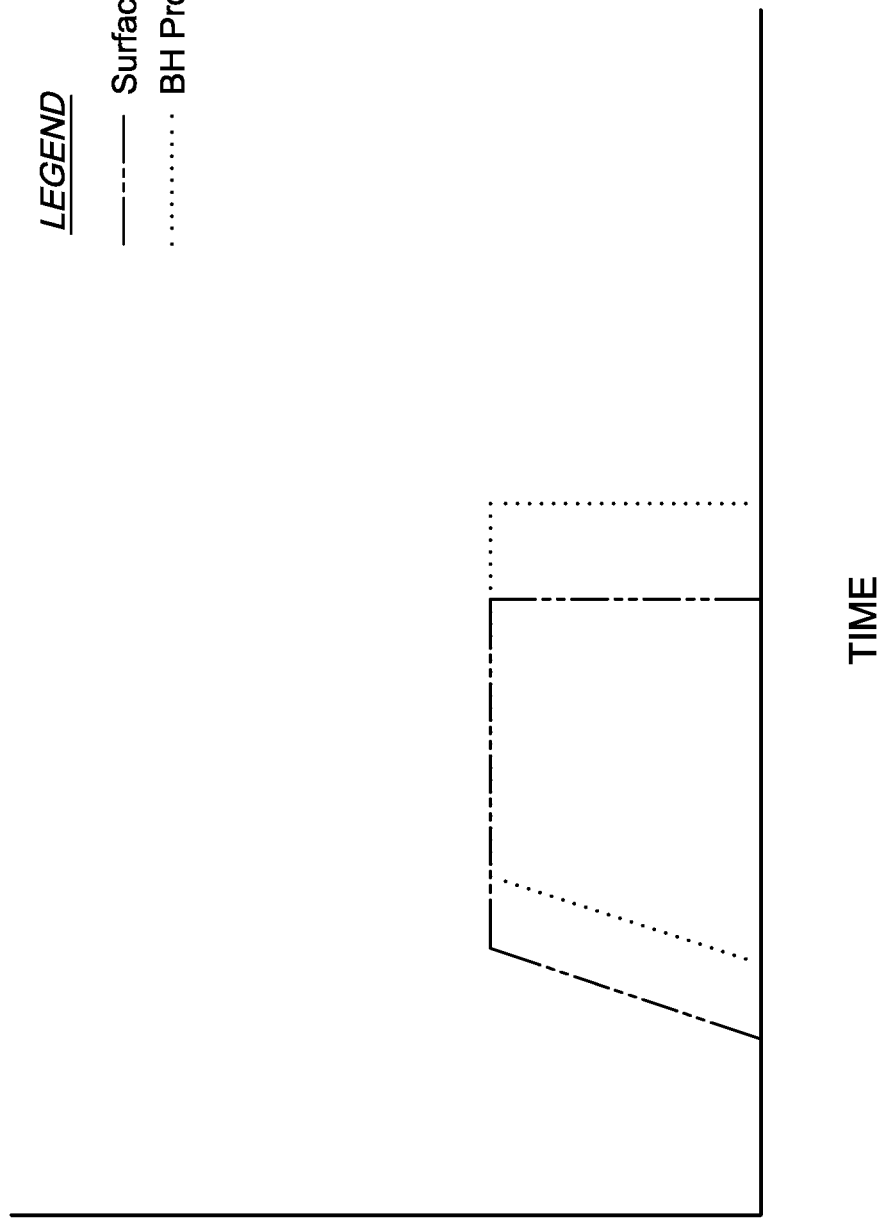
FIG. 5 is a diagram illustrating the method of this disclosure of increasing the proppant concentration in a ramp to maximum concentration.

Unlike these step-wise processes, preferred embodiments of this disclosure typically will increase the proppant concentration to the desired maximum proppant concentration in a "ramp to maximum manner" or "ramp to maximum concentration." As used herein, "ramp(s) to maximum" or "ramp to maximum concentration" refers to continuously increasing the proppant content in the treatment fluid until the desired (predetermined) maximum proppant concentration is reached. Thus, unlike the step-like manner, there are no periods of treatment where the proppant concentration is held constant at an amount less than the maximum proppant concentration. One type of such ramp to maximum manner is illustrated in FIG. 5. As will be realized from FIG. 5, in the ramp to maximum method illustrated here the proppant concentration is constantly and continuously increased until the predetermined maximum proppant concentration is reached and the proppant concentration is held at the predetermined maximum proppant concentration until the proppant treatment is finished. As used herein "constantly and continuously" and "constant and continuous manner" both refer to increasing the proppant concentration in a single continuous and constant manner without pausing at a concentration less than the desired maximum concentration for some period of time as is done in the step-wise manner illustrated in FIG. 4. Thus, the method illustrated in FIG. 5 involves quickly ramping up the pad-fluid introduction rate to the predetermined rate (for example, within 10 minutes or more preferably within 5 minutes). After the predetermined rate and/or volume of pad fluid is reached, proppant is added to produce the treatment fluid. The treatment fluid continues to be pumped at the predetermined rate while the proppant concentration is constantly and continuously increased, as shown in FIG. 5, until the maximum proppant concentration is reached (for example, within 40 minutes and more preferably within 25 minutes). Once the maximum proppant concentration is reached, the treatment fluid is held at that concentration and predetermined rate until the desired proppant volume is placed. Additionally, other types of ramp to maximum manner may be used. For example, after the maximum proppant concentration is reached, the proppant rate can be adjusted up or down during the treatment and at the same time maintaining a constant apparent viscosity, as described herein. As another example, the concentration of proppant can be continuously ramped-up such that the predetermined maximum concentration is reached at the end of the proppant treatment; thus, there would be little or no hold period of maintaining the predetermined maximum concentration. As another example, the proppant ramp can be continuous but not constant, that is the proppant concentration is continuously increased until the predetermined maximum concentration is reached but the rate of proppant concentration increase changes; however, the rate of proppant concentration is always greater than zero such that there is never a period of time where the proppant concentration is held constant until the predetermined maximum concentration is reached.

Further, the efficiency is enhanced by maintaining a constant apparent viscosity for the treatment fluid during the process. Thus, as proppant is added to the pad fluid to produce the treatment fluid, the viscosifier concentrations typically is lowered so as to counter the increased apparent viscosity resulting from the changes of conditions resulting from the addition of solids (proppant) into the treatment fluid. In embodiments, where a different treatment fluid ("second treatment fluid") from the pad fluid is used for introducing the proppant, the viscosifier concentration is typically adjusted to maintain the apparent viscosity of the pad fluid. However, it is within the scope of this disclosure to adjust the apparent viscosity of the second treatment fluid so as to maintain the apparent viscosity of the second treatment fluid prior to the addition of proppant instead of to maintain the apparent viscosity of the pad fluid. Apparent viscosity (sometimes denoted η) is the shear stress applied to the fluid divided by the shear rate. For a Newtonian fluid, the apparent viscosity is constant and equal to the Newtonian viscosity, but for non-Newtonian fluids, the apparent viscosity depends on the shear rate. Various formulas can be used to maintain a consistent downhole apparent viscosity. For example, the Krieger Dougherty formula of:

$$\eta_r = \left(1 - \frac{\phi}{\phi_{max}}\right)^{-2.5} \phi_{max}$$

where $\eta_r$ is the relative viscosity and $\phi$ is the packing fraction. Other formulas include Einstein, Batchelor, Quemada and Modified Eilers equations.

Figure 6:
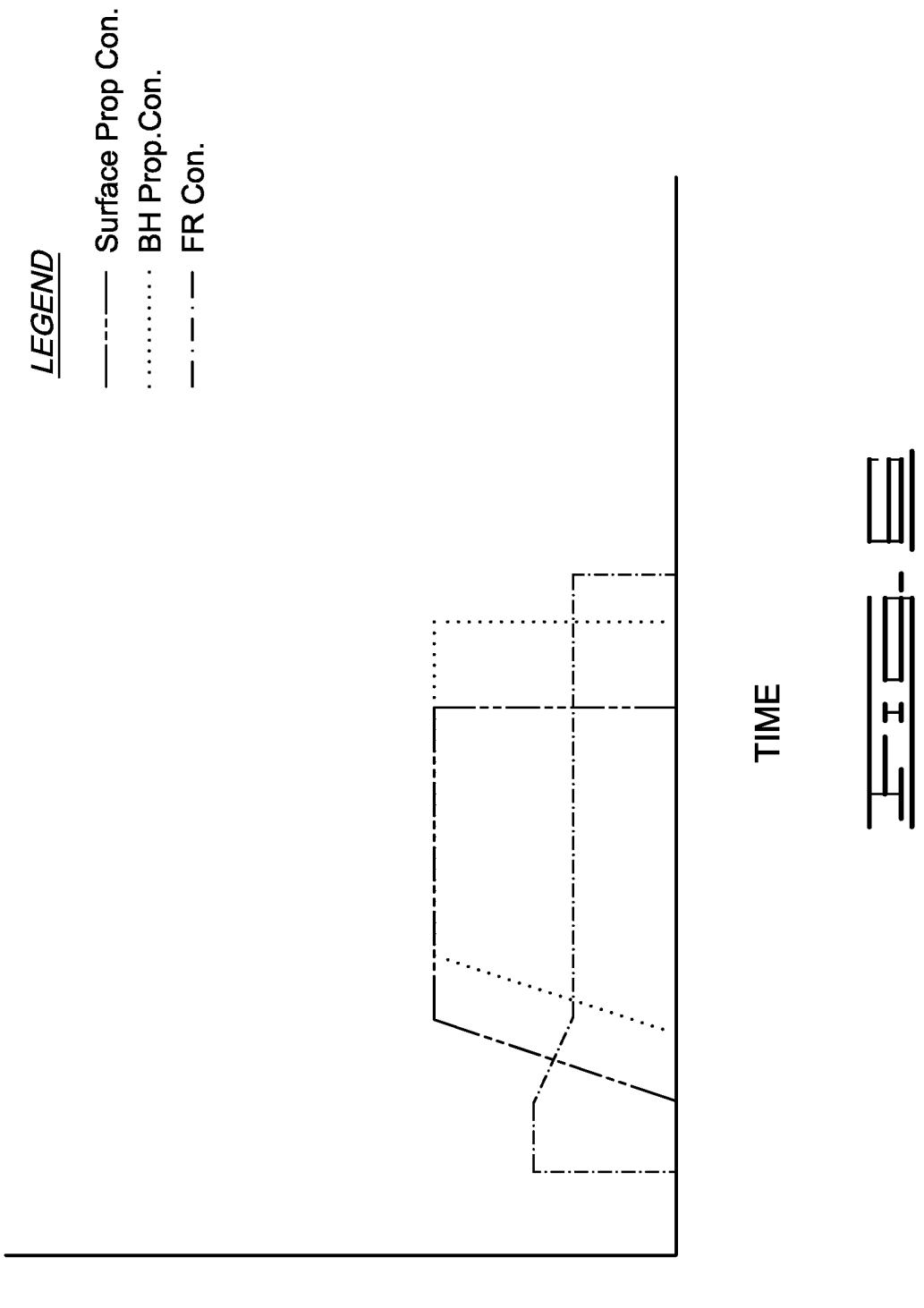
FIG. 6 is a diagram illustrating a proppant ramp, slurry rate and constant apparent slurry viscosity in accordance to current embodiments.

Referring to FIG. 6, a diagram illustrating proppant ramp, slurry rate and constant apparent slurry viscosity in accordance to current embodiments is shown. As can be seen as the proppant volume is increased in the slurry (treatment fluid) the viscosifier is reduced. For example, the amount of friction reduction additive in the treatment fluid can be reduced.

The process of pad fluid rate ramp, proppant ramp and adjusting the apparent downhole concentration to remain constant during the stimulation process can be automated or manually carried out by fixing a constant apparent viscosity and following the process as further described in reference to FIG. 7 below. A controller can monitor pressure, flow rates, proppant concentration, viscosifier concentration, calculated apparent viscosity and make adjustments on-the-fly.

Figure 7:
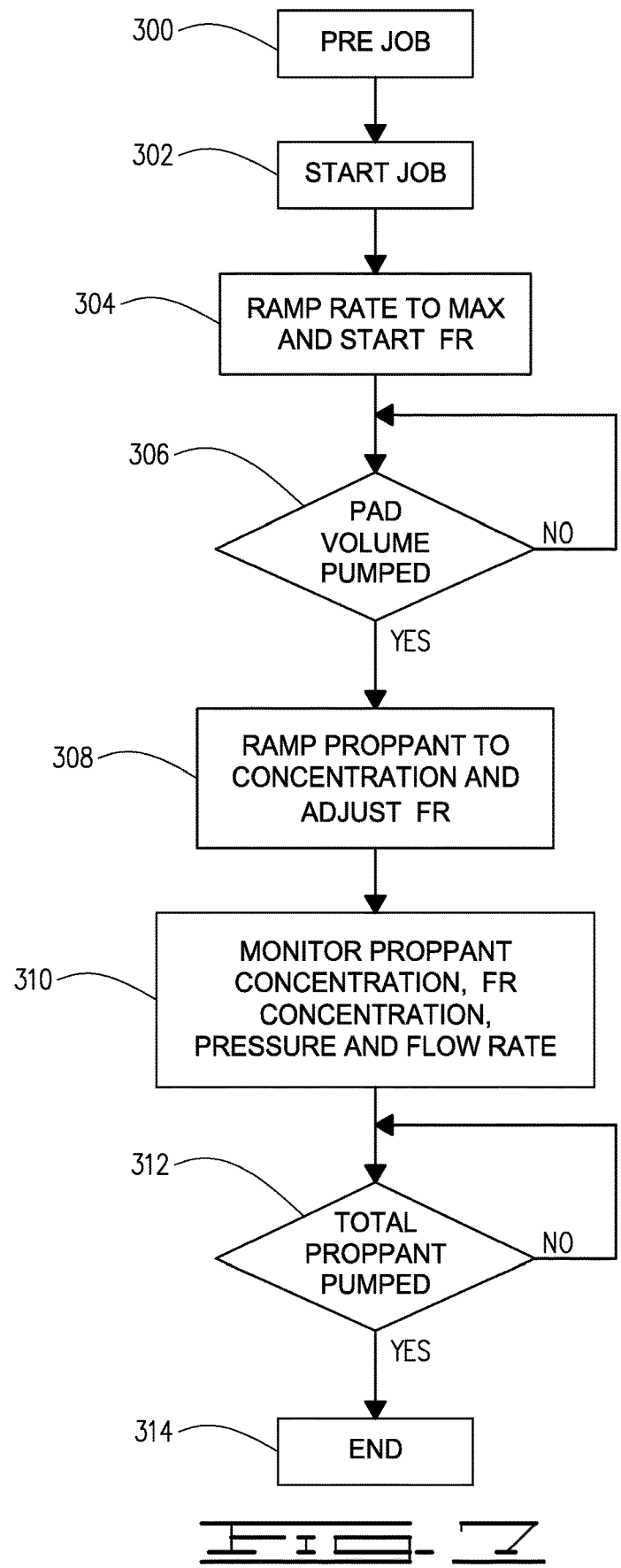
FIG. 7 is a process flow diagram showing a process in accordance with the current disclosure.

Turning now to FIG. 7, a process according to this disclosure will now be further described. The fracturing operation parameters are determined in the pre-job phase—step 300, that is the fluid (slurry) injection rate, maximum proppant concentration to be used, ramp time for reaching the maximum proppant concentration, proppant volume to be introduced to the subsurface reservoir, and constant apparent viscosity of the slurry to be maintained.

The job is started at step 302 followed by adding the viscosifier to the pad fluid or first slurry, and ramping up the slurry rate at step 304. As will be realized, the first slurry is generated by mixing the aqueous base fluid with gelling agents, other viscosifiers at a concentration necessary to achieve the predetermined apparent viscosity, which is dictated by the subsurface reservoir conditions. Other additives can also be added to the aqueous base fluid. At step 302, the injection rate of the first slurry to the subsurface reservoir is rapidly increased to a first target flow rate, which is determined based on the subsurface reservoir conditions. The first target flow rate is calculated to adequately open fractures to receive proppant to successfully carry out the fracturing operations.

Next, it is determined, such as by the controller, whether the pad volume pumped downhole has reached the predetermined volume necessary for the proppant stage in step 306. If not, then the process continues to introduce the pad fluid until the predetermined volume is reached. If the predetermined volume has been reached, then the process moves on to step 308.

In step 308, proppant is introduced into the first slurry to produce a second slurry or treatment fluid, which is then injected to the subsurface formation during the fracturing operations. During step 308, the proppant concentration is introduced into the second slurry such that concentration of the proppant in the second slurry ramps to maximum until a predetermined maximum concentration is reached. Generally, this ramp-up will be done in 2 hours or less, or in 1 hour or less. In some embodiments, this ramp-up will be done in 40 minutes or less or even 25 minutes or less.

During the ramp-up of the proppant concentration and while the second slurry is being injected into the subsurface formation, various aspects of the second slurry are monitored and adjusted. For example, the proppant concentration, viscosifier concentration, pressure and flow rate of the second slurry can be monitored, which occurs at step 310. In some embodiments, the flow rate of the second slurry will be changed during the process. Thus, for example, the second slurry can be initially injected at a flow rate equal to the first target flow rate, subsequently, the flow rate of the second slurry can be increased or decreased.

Further, these monitored aspects are used to calculate a real time apparent viscosity for the second slurry. Based on this calculation, the concentration of viscosifier in the second slurry is adjusted so as to maintain a constant apparent viscosity during the injection of the second slurry. Typically, the constant apparent viscosity is maintained so that it is substantially equal to the predetermined apparent viscosity of the first slurry.

At step 312, the total volume of proppant delivered to the subterranean formation is determined. For example, the volume can be calculated from the flow rate and the proppant concentration of the second slurry. When the total volume reaches a predetermined volume, the process is ended and the injection of the second slurry is stopped. Thus, the second slurry is injected until the predetermined volume of proppant has been delivered to the subterranean formation. After the total predetermined amount of proppant is pumped down-hole, the process can be ended in step 314.

The pad fluids or treatment fluids used in the above described stimulation operations generally are slurries comprising an aqueous base fluid and an additive that increases the viscosity of the treatment fluid over the base fluid alone ("viscosifier", which as used herein more specifically refers to gelling agents and friction reducers). Suitable aqueous base fluids that may be used in the treatment fluids of the present disclosure may include fresh water, salt water, brine, formation brine, seawater, or any other aqueous fluid that, preferably, does not adversely interact with the other components used in accordance with this disclosure or with the subterranean formation. In some embodiments, the aqueous base fluid may be present in the treatment fluids of the present disclosure in an amount in the range from about 5% to 99.99% by volume of the treatment fluid.

The viscosifiers herein are chemical additives which function to alter the fluid rheology by enhancing the viscosity of the pad fluid. Generally, the viscosifiers useful for the methods of the current disclosure are either friction reducers and/or gelling agents, which can be adjusted to maintain a constant apparent viscosity at the perforations when proppant is being added to the treatment fluid. While typically only the amounts of gelling agents or the friction reducers in the treatment fluid will be adjusted, it is within the scope of this disclosure to adjust both the gelling agents and friction reducers to achieve such a constant apparent viscosity.

In embodiments, the viscosifiers are adjusted as proppant is added to the pad fluid to achieve a constant viscosity. As indicated, the viscosifier can include both gelling agents and friction reducers, the friction reducers are chemical additives that reduce friction in the treatment system and increase viscosity. During the placement of aqueous treatment fluids into a wellbore, a considerable amount of energy may be lost due to friction between the treatment fluid in turbulent flow and the formation and/or tubular goods (e.g., pipes, coiled tubing, etc.) disposed within the well bore. As a result of these energy losses, additional horsepower may be necessary to achieve the desired treatment. To reduce these energy losses, friction reducers have been included in aqueous treatment fluids. On the other hand, gelling agents typically increase viscosity and have minimal if any effect of friction reduction. It will be understood that there can be some overlap between gelling agents and friction reducers.

The friction reducers useful for the methods of this disclosure comprise aqueous solutions of a chemical additive which function to alter the fluid rheology by enhancing the viscosity and lowering the friction. For example, the chemical additive can comprise a polymer, e.g., polyacrylamide. The polymers useful as friction reducers are polymers that reduce frictional losses due to friction between an aqueous fluid in turbulent flow and tubular components (e.g. pipes, coiled tubing, etc.) and/or the formation. The term "polymer," as used herein, is intended to include both the acid form of the polymer as well as its various salts.

Examples of polymers suitable for use as viscosifiers include, without limitation, polysaccharides, polyacrylamide, or combinations thereof. Typically, the polymers used are in the form of water-soluble polymers.

The viscosifiers may comprise polysaccharides that may be capable of being crosslinked. These viscosifiers are often gelling agents and include, but are not limited to, diutan gums, xanthan gums, and other polysaccharides including galactomannans, cellulose derivatives, derivatives thereof, and any combination thereof. Other suitable gums include, but are not limited to, hydroxyethylguar, hydroxypropylguar, carboxymethylguar, carboxymethylhydroxyethylguar and carboxymethylhydroxypropylguar. Examples of suitable cellulose derivatives include hydroxyethyl cellulose, carboxyethylcellulose, carboxymethylcellulose, and carboxymethylhydroxyethylcellulose; derivatives thereof, and combinations thereof. The crosslinkable polymers included in the treatment fluids of the present disclosure may be naturally-occurring, synthetic, or a combination thereof. Typically, the concentration of these viscosifiers in the base fluid will depend on the desired viscosity. Often, such concentrations are from about 5 lb per 1000 gallons of base fluid to about 100 lb per 1000 gallons of base fluid.

Additionally, any water-based anionic friction-reducing polymer suitable for use in subterranean applications may be suitable for use in the present disclosure. These are typically referred to as friction reducers. An example of a suitable water-based friction-reducing polymer comprises acrylamide. In some embodiments, a polymer comprising acrylamide may be partially hydrolyzed acrylamide. As used in this disclosure, "partially hydrolyzed acrylamide" refers to acrylamide wherein in the range of from about 3% to about 70% of the amide groups have been hydrolyzed to carboxyl groups. An example of a suitable water-based friction-reducing polymer comprising acrylamide is a copolymer comprising acrylamide and acrylic acid.

The term "copolymer," as used herein, is not limited to polymers comprising two types of monomeric units, but includes any combination of monomeric units, e.g., terpolymers, tetrapolymers, and the like. Suitable water-based friction reducing polymers may further comprise additional monomers, such as 2-acrylamido-2-methylpropane sulfonic acid, N,N-dimethylacrylamide, vinyl sulfonic acid, N-vinyl acetamide, N-vinyl formamide, itaconic acid, methacrylic acid, diallyl dimethyl ammonium chloride, and combinations thereof.

In some embodiments, the acrylamide may be present in the water-based friction reducing polymers in an amount in the range of from about 5% to about 100% by weight of the polymer, or in an amount in the range of from about 50% to about 95%, or from about 60% to about 90% by weight of the polymer.

The water-based friction reducing polymers further may comprise acrylic acid. In some embodiments, the acrylic acid may be present in the water-based friction reducing polymers in an amount in the range of from about 5% to about 95% by weight of the polymer, or in an amount in the range of from about 5% to about 50%, from about 10% to about 40% or from about 20% to about 40% by weight of the polymer Optionally, the friction reducing copolymers for use in the treatment fluids of the present disclosure may further comprise other monomers in addition to acrylamide and acrylic acid. For example, in some embodiments, the friction reducing copolymers may comprise 2-acrylamido-2-methylpropane sulfonic acid, N,N-dimethylacrylamide, vinyl sulfonic acid, N-vinyl acetamide, N-vinyl formamide, itaconic acid, methacrylic acid, diallyl dimethyl ammonium chloride, or mixtures thereof.

In certain embodiments, 2-acrylamido-2-methylpropane sulfonic acid may be present in the friction reducing copolymers of the present disclosure in an amount in the range of from about 0.1% to about 30% by weight of the copolymer. An example of a suitable friction reducing copolymer may comprise acrylamide in an amount in the range of from about 70% to about 85% by weight of the copolymer, acrylic acid in an amount in the range of from about 10% to about 12.5% by weight of the copolymer, and 2-acrylamido-2-methylpropane sulfonic acid in an amount in the range of from about 2.5% to about 20% by weight of the copolymer.

In certain embodiments, N,N-dimethylacrylamide may be present in the friction reducing copolymers of the present disclosure in an amount in the range of from about 0.1% to about 30% by weight of the copolymer. An example of a suitable friction reducing copolymer may comprise acrylamide in an amount in the range of from about 60% to about 80% by weight of the copolymer, acrylic acid in an amount in the range of from about 10% to about 12.5% by weight of the copolymer, and N,N-dimethylacrylamide in an amount in the range of from about 2.5% to about 10% by weight of the copolymer.

In some embodiments, vinyl sulfonic acid may be present in the friction reducing copolymers of the present disclosure in an amount in the range of from about 0.1% to about 30% by weight of the copolymer. An example of a suitable friction reducing copolymer may comprise acrylamide in an amount in the range of from about 60% to about 85% by weight of the copolymer, acrylic acid in an amount in the range of from about 10% to about 20% by weight of the copolymer, and vinyl sulfonic acid in an amount in the range of from about 0.1% to about 5% by weight of the copolymer.

In some embodiments, N-vinyl acetamide may be present in the friction reducing copolymers of the present disclosure in an amount in the range of from about 0.1% to about 30% by weight of the copolymer. An example of a suitable friction reducing copolymer may comprise acrylamide in an amount in the range of from about 60% to about 85% by weight of the copolymer, acrylic acid in an amount in the range of from about 10% to about 20% by weight of the copolymer, and N-vinyl acetamide in an amount in the range of from about 0.1% to about 5% by weight of the copolymer.

In some embodiments, N-vinyl formamide may be present in the friction reducing copolymers of the present disclosure in an amount in the range of from about 0.1% to about 30% by weight of the copolymer. An example of a suitable friction reducing copolymer may comprise acrylamide in an amount in the range of from about 60% to about 85% by weight of the copolymer, acrylic acid in an amount in the range of from about 10% to about 20% by weight of the copolymer, and N-vinyl formamide in an amount in the range of from about 0.1% to about 5% by weight of the copolymer.

The friction reducing polymers for use in the treatment fluids of the present disclosure should have a molecular weight sufficient to provide a desired level of friction reduction. Generally, friction-reducing polymers having higher molecular weights may be needed to provide a desirable level of friction reduction. For example, in some embodiments, the average molecular weight of the friction reducing polymers may be in the range of from about 1,000,000 to about 50,000,000, as determined using intrinsic viscosities. In other embodiments, the average molecular weight of the friction reducing polymers may be in the range of from about 2,000,000 to about 20,000,000. In other embodiments, the average molecular weight of the friction reducing polymers may be in the range of from about 7,500,000 to about 15,000,000. Those of ordinary skill in the art will recognize that friction-reducing polymers having molecular weights outside the listed range may still provide some degree of friction reduction in an aqueous treatment fluid.

In some embodiments, the friction-reducing polymer may be present in an amount in the range of from about 20 ppm to about 5,000 ppm by weight of the water being treated. In some embodiments, the friction-reducing polymer may be present in an amount in the range of from about 100 ppm to about 3,000 ppm by weight of the water being treated. In other embodiments, the friction-reducing polymer may be present in an amount in the range of from about 100 ppm to about 1,000 ppm by weight of the water being treated.

The friction reducing polymers may be provided in any suitable form, including in a solid form, as an oil-external emulsion, or as a component of an aqueous solution. In embodiments where a particular friction-reducing polymer is provided as an oil-external emulsion, the oil-external emulsion may comprise water, a water-immiscible liquid, an emulsifying surfactant, and a friction-reducing polymer. Suitable oil-external emulsion further may comprise inhibitors, salts, and inverters. As those of ordinary skill in the art will appreciate, with the benefit of this disclosure, upon addition to the aqueous treatment fluid, the emulsion should invert, releasing the friction-reducing polymer into the treatment fluid.

Also, the pad fluids or treatment fluids used in the above described stimulation operations may include diverting agents The diverting agents used in the methods and systems of the present disclosure may comprise any particulate material capable of altering some or all of the flow of a substance away from a particular portion of a subterranean formation to another portion of the subterranean formation or, at least in part, ensure substantially uniform injection of a treatment fluid (e.g., a fracturing fluid) over the region of the subterranean formation to be treated. Diverting agents may, for example, selectively enter more permeable zones of a subterranean formation, where they may create a relatively impermeable barrier across the more permeable zones of the formation (including by bridging one or more fractures), thus serving to divert a subsequently introduced fracturing fluid into the less permeable portions of the formation. Examples of particulate diverting materials that may be suitable for use in certain embodiments of the present disclosure may include, but are not limited to, naphthalene, clean tar, starch, moth balls, naphthalinic flakes, wax beads, boric oxide; derivatives of the foregoing; and combinations of any of the foregoing. In certain embodiments, the proppants used in the methods and systems of the present disclosure may serve a dual purpose as both a proppant particulate (i.e., preventing fractures from fully closing upon the release of the hydraulic pressure, forming conductive channels through which fluids may flow to a well bore) and as a diverting agent. Such dual-purpose particulates may be referred to herein as "self-diverting" proppants.

In certain embodiments, a diverting agent's diverting effects may be temporary. For example, a degradable and/or soluble diverting agent may be used such that it degrades or dissolves, for example, after a period of time in the subterranean formation or when contacted by a particular fluid or fluids. Examples of degradable diverting agents that may be suitable for use in certain embodiments of the present disclosure include, but are not limited to, fatty alcohols, fatty acid salts, fatty esters, proteinous materials, degradable polymers, and the like. Suitable examples of degradable polymers that may be used in accordance with the present disclosure include, but are not limited to, homopolymers, random, block, graft, and star- and hyper-branched polymers. Specific examples of suitable polymers include polysaccharides such as dextran or cellulose; chitin; chitosan; proteins; aliphatic polyesters; poly(lactide); poly(glycolide); poly(.epsilon.-caprolactone); poly(hydroxybutyrate); poly(anhydrides); aliphatic polycarbonates; poly(acrylamide); poly(ortho esters); poly(amino acids); poly(ethylene oxide); and polyphosphazenes. Polyanhydrides are another type of degradable polymers that may be suitable for use as degradable diverting agents in the present disclosure. Examples of polyanhydrides that may be suitable include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

In addition to viscosifiers and diverting agents, the treatment fluids can also optionally comprise other additives as are known in the art, such as salts, pH control additives, surfactants, breakers, bactericides, crosslinkers, fluid loss control additives, stabilizers, chelants, scale inhibitors, paraffin inhibitors, asphaltene inhibitors, mutual solvents, solvents, corrosion inhibitors, hydrate inhibitors, clay stabilizers, salt substitutes (such as tetramethyl ammonium chloride), relative permeability modifiers (such as HPT-1™ chemical additive available from Halliburton Energy Services, Duncan, Okla.), sulfide scavengers, fibers, nanoparticles, consolidating agents (such as resins and/or tackifiers), combinations thereof, or the like.

The above method, its steps and systems incorporating the method can be better understood by the following examples, which support and illustrate the process.

Example 1

Figure 8:
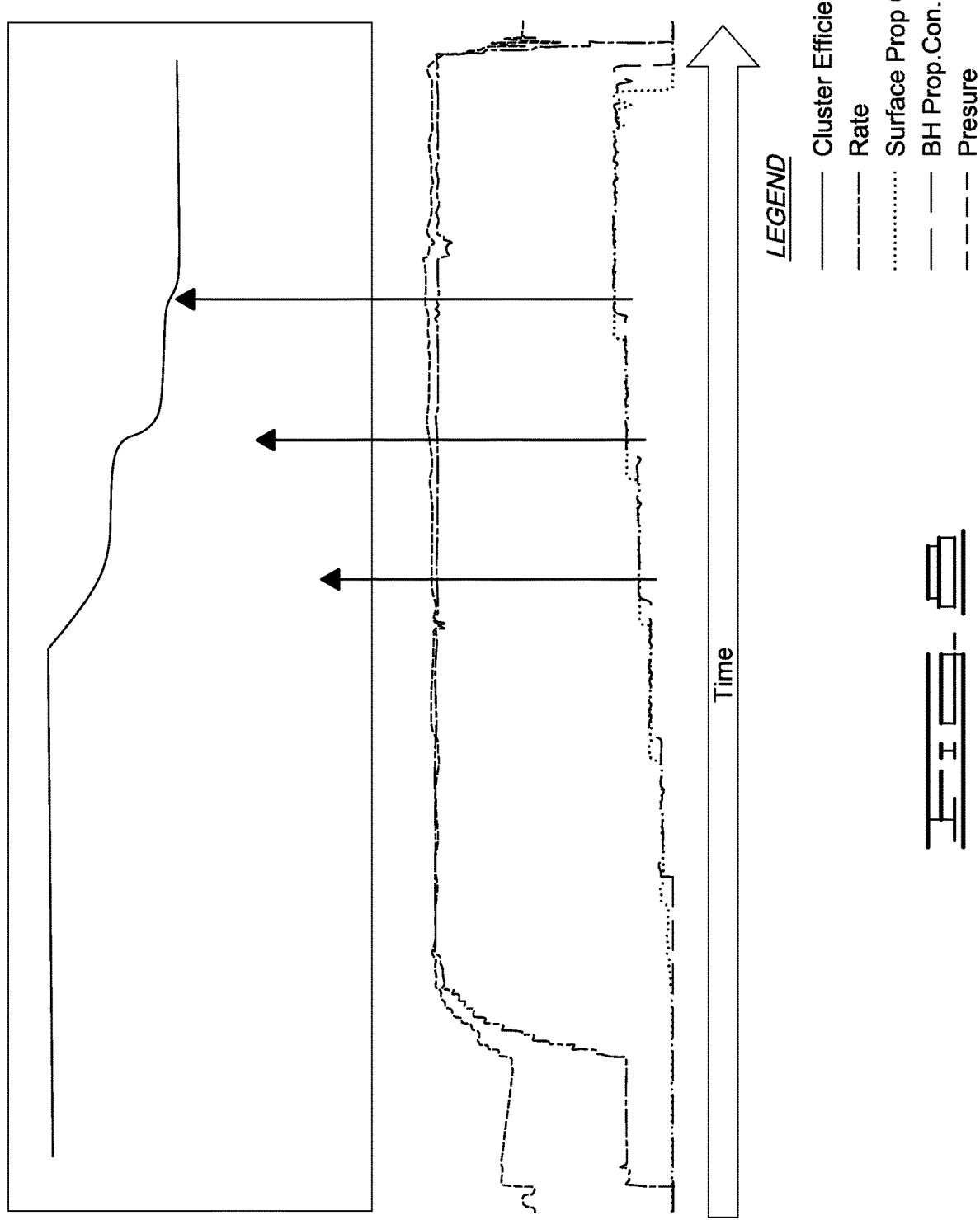
FIG. 8 is a graph illustrating the treatment data of the Control and the resulting perforation intensity—represented by cluster efficiency with time.

A well treatment operation was carried out wherein the pad fluid (treatment fluid without proppant) was increased until a predetermined volume was reached. At that time, proppant was introduced into the treatment fluid in a conventional step-wise manner, with each step lasting from about 10 minutes to about an hour. FIG. 8 illustrates the treatment data and the resulting perforation intensity—represented by cluster efficiency with time, which is defined as:

$$\left(\frac{(num \text{ of clusters on target} + num \text{ of clusters over target})}{\text{total number of clusters in stage}}\right) \times 100$$

Figure 9:
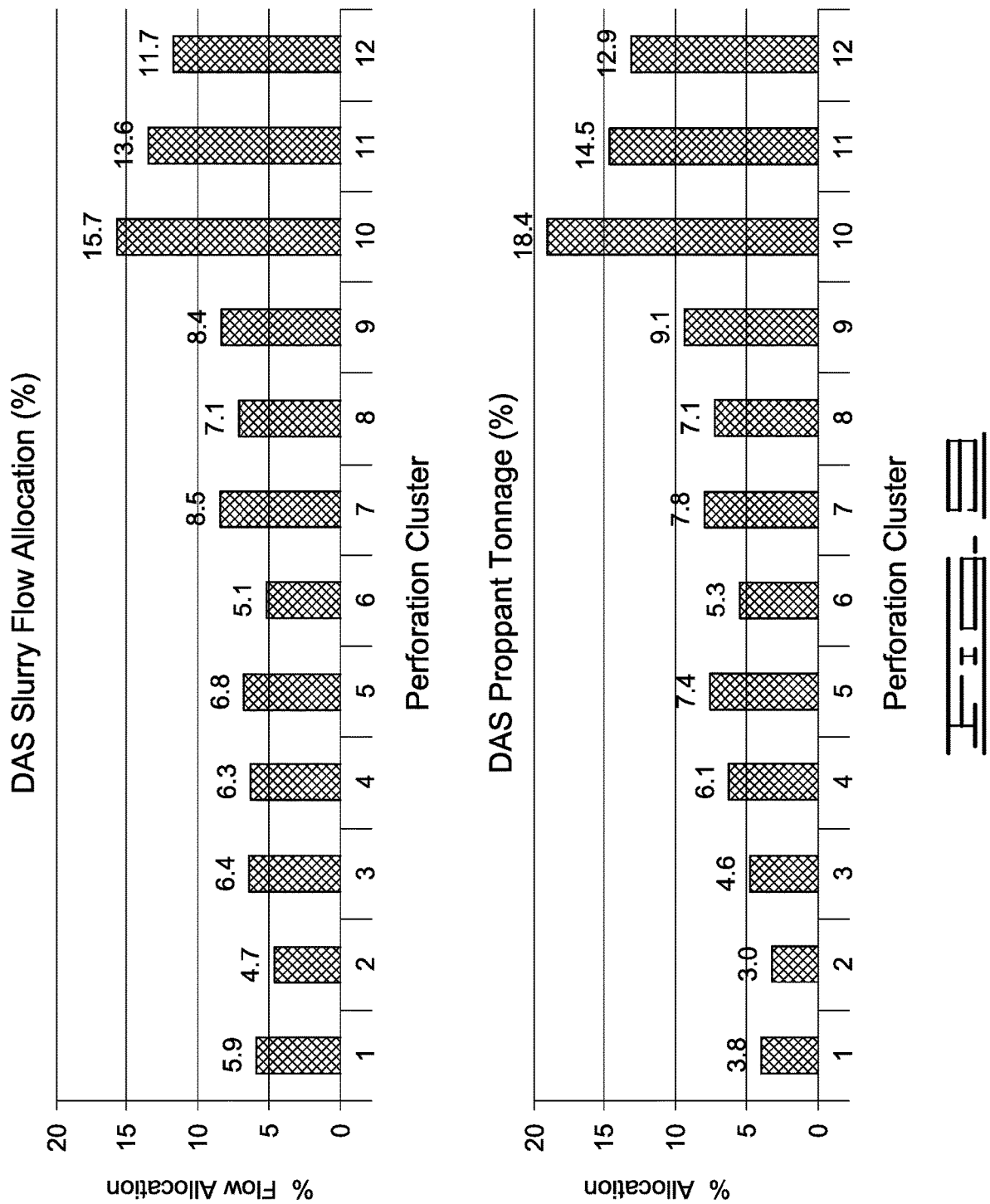
FIG. 9 is a graphical illustration of proppant concentration (%-allocation) versus perforation cluster for the Control.

As can be seen from FIG. 8, as the proppant concentration is increased downhole (step-wise) the perforation intensity begins to diminish. At the end of the job, the flow distribution is dominated by three clusters as shown in FIG. 9. The cluster efficiency in this case was 58%.

Example 2

Figure 10:
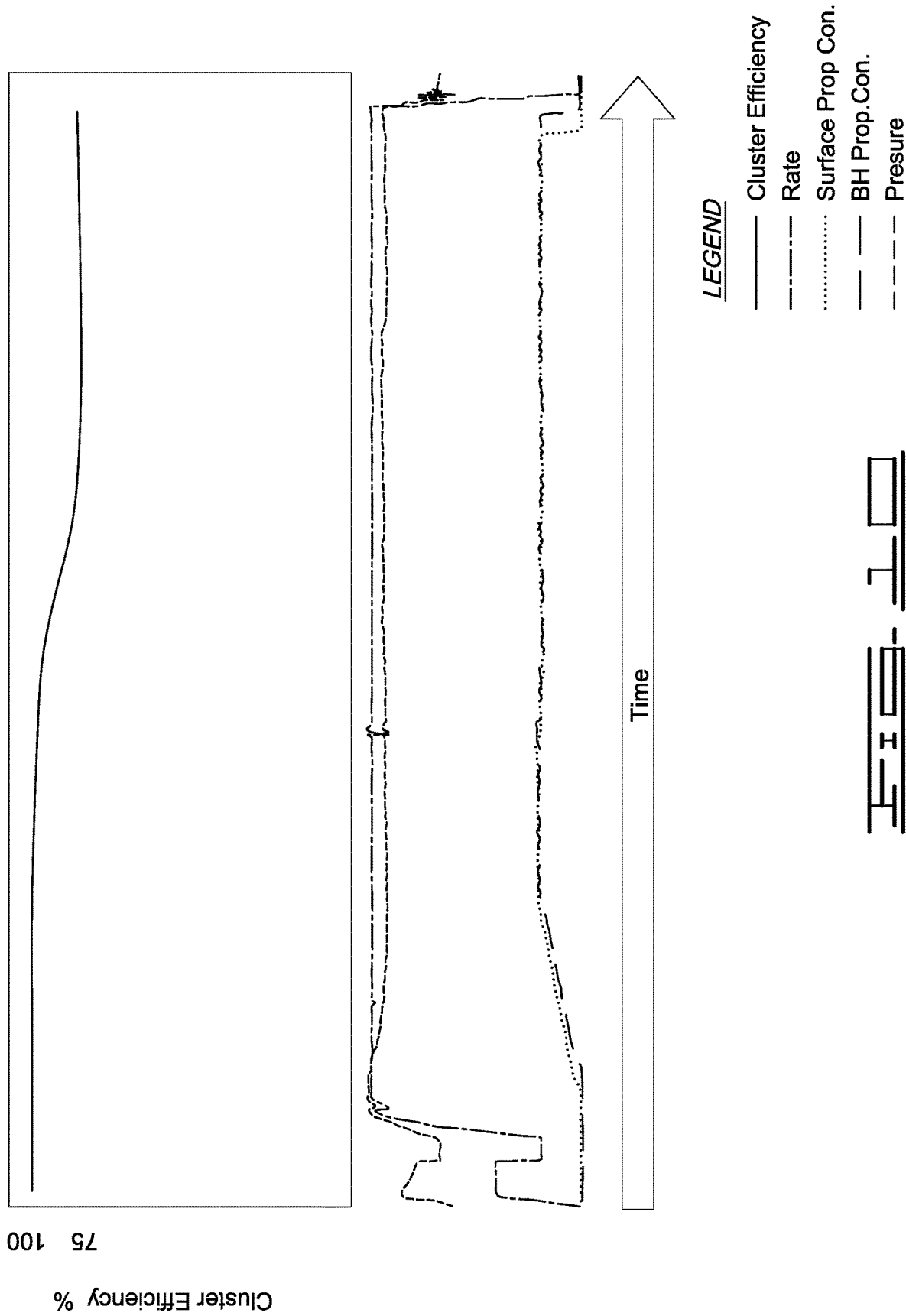
FIG. 10 is a graph illustrating the treatment data of the Example and the resulting perforation intensity—represented by cluster efficiency with time.

A well treatment operation was carried out wherein the pad fluid (treatment fluid without proppant) was increased until a predetermined volume was reached. At that time, proppant was introduced into the treatment fluid in a ramp to maximum manner in accordance with this disclosure. The proppant ramp to maximum concentration was in about 23 minutes. FIG. 10 illustrates the treatment data and the resulting perforation intensity—represented by cluster efficiency with time. As can be seen from FIG. 10, the use of the current treatment method resulted in a very consistent perforation intensity when compared to the treatment method of Example 1. At the end of the job, the flow distribution (FIG. 11) was more uniformly distributed than the treatment method of Example 1 with a cluster efficiency of about 75%.

The above disclosure is exemplified by a method comprising:
  providing a first slurry containing gelled treatment fluid and a viscosifier so as to provide the first slurry with a first apparent viscosity, wherein the first slurry is substantially free of proppant;
  introducing a proppant into the first slurry to produce a second slurry;
  injecting the second slurry into the subterranean formation during fracturing operations;
  calculating an apparent viscosity for the second slurry; and
  adjusting the amount of viscosifier in the second slurry based on the calculated apparent viscosity so that the second slurry is maintained at the first apparent viscosity during injection of the second slurry.

The above disclosure is also exemplified by a method comprising:

injecting a first slurry into a subterranean formation at a first target flow rate during a fracturing operation, wherein the first slurry is a pad fluid, and has a first apparent viscosity;
  after a predetermined volume of the first slurry has been injected into the subterranean formation, injecting a second slurry into the subterranean formation during the fracturing operations, wherein the second slurry comprises a base fluid, a viscosifier and a proppant;
  calculating an apparent viscosity for the second slurry; and
  adjusting the amount of viscosifier in the second slurry based on the calculated apparent viscosity so that the second slurry is maintained at the first apparent viscosity during injection of the second slurry.

In the above methods, the pad fluid can comprise one or more gelling agents. Also, the first slurry is typically substantially free of proppant and the viscosifier is a friction reducer. For example, the friction reducer can be selected from the group consisting of polysaccharides, polyacrylamide, and combinations thereof.

The above methods can further comprise:
  monitoring the pressure, flow rate, proppant concentration and viscosifier concentration of the second slurry during injection; and
  calculating the apparent viscosity of the second slurry from the proppant concentration and viscosifier concentration.

The methods can also comprise calculating a volume of proppant delivered to the subterranean formation from the flow rate and the proppant concentration of the second slurry. Also, in the methods, the proppant can be introduced into the second slurry such that concentration of the proppant in the second slurry ramps to maximum until a predetermined maximum concentration is reached. Further, the second slurry can be injected until a predetermined volume of proppant has been delivered to the subterranean formation.

Additionally, in the methods, the first slurry and second slurry are injected using a pump.

Therefore, the present compositions and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of enhancing perforation cluster efficiency during a fracturing operation, the method comprising:
(i) injecting a first slurry into a subterranean formation at a first target flow rate during a fracturing operation, wherein the first slurry is a pad fluid, and has a first apparent viscosity;
(ii) after a predetermined volume of the first slurry has been injected into the subterranean formation, injecting a second slurry into the subterranean formation during the fracturing operation, wherein the second slurry comprises a base fluid, a viscosifier and an amount of proppant, and the second slurry has a proppant concentration;
(iii) increasing the amount of proppant in the second slurry during the fracturing operation so that during the fracturing operation the proppant concentration increases from an initial proppant concentration to a predetermined maximum proppant concentration, and wherein the proppant is introduced into the second slurry such that concentration of the proppant in the second slurry ramps to maximum until a predetermined maximum concentration is reached such that the proppant concentration is constantly and continually increased to the predetermined maximum proppant concentration and not held constant for a period of time at a concentration less than the predetermined maximum proppant concentration;
(iv) monitoring pressure, flow rate, proppant concentration and viscosifier concentration of the second slurry during injection of the second slurry;
(v) calculating an apparent viscosity for the second slurry as the proppant concentration is increased during step (ii) and step (iii), wherein said calculating is at least partially based on the monitoring in step (iv); and
(vi) adjusting the amount of viscosifier in the second slurry based on the calculated apparent viscosity so that the second slurry is maintained constant at the first apparent viscosity during the fracturing operation so as to maintain constant apparent viscosity through different concentrations of proppant hence to enhance perforation cluster efficiency to about 75%.

2. The method of claim 1, wherein the first slurry is free of proppant.

3. The method of claim 1, wherein the viscosifier is a friction reducer such that addition of friction reducer to the second slurry results in a reduction in friction due to flow of the second slurry.

4. The method of claim 3, wherein the friction reducer is selected from the group consisting of polysaccharides, polyacrylamide, and combinations thereof.

5. The method of claim 1, wherein a diverting agent is injected with the second slurry and while maintaining the first apparent viscosity.

6. The method of claim 1, wherein the pad fluid comprises one or more gelling agents.

7. The method of claim 1, wherein the second slurry is initially injected at a flow rate equal to the first target flow rate and the method further comprising thereafter changing the flow rate for the second slurry.

8. The method of claim 1, wherein the viscosifier is a friction reducer such that addition of friction reducer to the second slurry results in a reduction in friction due to flow of the second slurry, and wherein the friction reducer is selected from the group consisting of polysaccharides, polyacrylamide, or combinations thereof.

9. The method of claim 1, wherein the first slurry and second slurry are injected using a pump.

10. A method of enhancing perforation cluster efficiency during a fracturing operation, the method comprising:
(i) providing a first slurry containing gelled treatment fluid and a viscosifier so as to provide the first slurry with a first apparent viscosity, wherein the first slurry is free of proppant;
(ii) introducing an amount of proppant into the first slurry to produce a second slurry at an initial concentration;
(iii) injecting the second slurry into the subterranean formation during the fracturing operation;
(iv) increasing the amount of proppant in the second slurry during the fracturing operation and continuing to inject the second slurry so that during the fracturing operation the proppant concentration increases from the initial proppant concentration to a predetermined maximum proppant concentration, and wherein the proppant is introduced into the second slurry such that concentration of the proppant in the second slurry ramps to maximum increases until a predetermined maximum concentration is reached such that the proppant concentration is constantly and continually increased to the predetermined maximum proppant concentration and not held constant for a period of time at a concentration less than the predetermined maximum proppant concentration;
(v) monitoring pressure, flow rate, proppant concentration and viscosifier concentration of the second slurry during injection of the second slurry;
(vi) calculating an apparent viscosity for the second slurry as the proppant concentration is increased during step (iv), wherein the calculation of the apparent viscosity is based on the proppant concentration and viscosifier concentration; and
(vii) adjusting the amount of viscosifier in the second slurry based on the calculated apparent viscosity so that the second slurry is maintained constant at the first apparent viscosity during the fracturing operation so as to maintain constant apparent viscosity through different concentrations of proppant hence enhancing perforation cluster efficiency to about 75%.

11. The method of claim 10, wherein the viscosifier is a friction reducer such that addition of friction reducer to the second slurry results in a reduction in friction due to flow of the second slurry, and wherein the friction reducer is selected from the group consisting of polysaccharides, polyacrylamide, and combinations thereof.

12. The method of claim 10, further comprising calculating a volume of proppant delivered to the subterranean formation from the flow rate and the proppant concentration of the second slurry.

* * * * *